(No Model.)

W. R. BARKER.
FISH NET OR TRAP.

No. 470,314. Patented Mar. 8, 1892.

Witnesses
Edwin L. Bradford
Frank H. Thatcher

Inventor
William R. Barker
By Patrick O'Farrell,
Attorney

UNITED STATES PATENT OFFICE.

WILLIAM R. BARKER, OF EDWARDSVILLE, ALABAMA.

FISH NET OR TRAP.

SPECIFICATION forming part of Letters Patent No. 470,314, dated March 8, 1892.

Application filed October 12, 1891. Serial No. 408,475. (No model.)

*To all whom it may concern:*

Be it known that I, WILLIAM R. BARKER, a citizen of the United States of America, residing at Edwardsville, in the county of Cleburne and State of Alabama, have invented certain new and useful Improvements in Fish Nets or Traps, of which the following is a specification, reference being had therein to the accompanying drawings.

My invention relates to nets or traps for ensnaring fish and other water game.

My invention consists in the material used and the method of constructing the trap, the object of my invention being to make a trap that will be efficient, strong, and durable, and nearly or quite invisible when under water.

Figure 1:
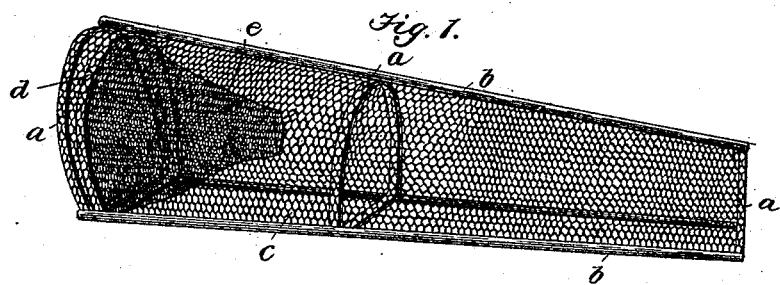
Figure 2:
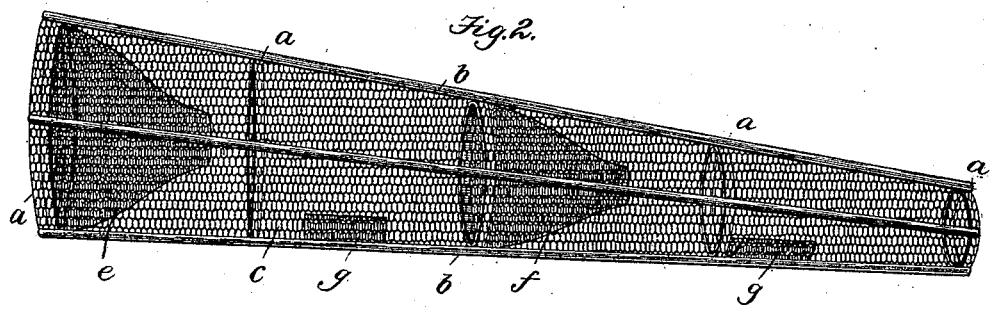
Figure 3:
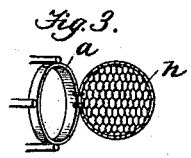

In the accompanying drawings, Figure 1 is a side view of one form of my improved trap, in which the bottom is shown as being flat. Fig. 2 is also a side view showing another form of my improved trap, in which the bottom is shown as being round. Fig. 3 is a detail showing the door situated at the small end of the trap for removing the game.

Referring to the drawings by letters of reference, $a$ $a$ represent a series of rings or hoops for supporting the wire-netting $c$.

$b$ $b$ are rods running longitudinally along the top, bottom, and sides, to which the rings $a$ $a$ and the netting $c$ are attached, these rods holding the rings firmly in position and making a strong frame-work, to which the netting may be attached by any suitable means.

The mouth of the trap is provided with the usual pringle or close, which permits of ready ingress, but prevents or hinders egress from the trap. Fig. 2 shows the trap provided with pringles $e$ and $f$ and bait-pockets $g$ $g$.

The small end of the trap is provided with a door, as shown in Fig. 3, for removing the game.

The trap may be made of any suitable material and may be made by covering the frame with sheet-netting or by weaving the wire directly upon the frame. I prefer to use galvanized or plated wire in order to render the trap invisible when under water.

Having thus described my invention, what I claim as new, and desire to secure by Letters Patent, is—

1. In a trap for fish and other water game, the frame consisting of a series of longitudinal rods $b$, supported at their ends and interjacently by suitable rings or supports $a$, and the cover or netting $c$, in combination with the pringles $e$ and outwardly-opening door $h$, by which one end of the trap is normally closed and the other secured against egress, substantially as described.

2. In a trap for fish and other water game, the frame consisting of a series of longitudinal rods $b$, supported at their ends and interjacently by rings or supports $a$, the bait-pockets $g$ $g$, and cover or netting $c$, in combination with the pringles $e$ and outwardly-opening door $h$, by which one end of the trap is normally closed and the other secured against egress, substantially as described.

In testimony whereof I affix my signature in presence of two witnesses.

WILLIAM R. BARKER.

Witnesses:
T. J. JOHNS,
T. J. BURTON.